United States Patent
Jung et al.

(10) Patent No.: US 7,453,380 B2
(45) Date of Patent: Nov. 18, 2008

(54) APPARATUS AND METHOD FOR PROCESSING ANALOG SIGNALS AND OUTPUTTING DIGITALLY CONVERTED ANALOG SIGNALS USING SERIAL BUS

(75) Inventors: Eui Suk Jung, Daejeon (KR); Chul Soo Lee, Daejeon (KR); Seung Hyun Jang, Daejeon (KR); Byoung Whi Kim, Daejeon (KR)

(73) Assignee: Electronics And Telecommunications Research Institute (KR)

( * ) Notice: Subject to any disclaimer, the term of this patent is extended or adjusted under 35 U.S.C. 154(b) by 0 days.

(21) Appl. No.: 11/588,139

(22) Filed: Oct. 26, 2006

(65) Prior Publication Data
US 2007/0126613 A1    Jun. 7, 2007

(30) Foreign Application Priority Data
Dec. 7, 2005   (KR) .................. 10-2005-0119068
Sep. 6, 2006   (KR) .................. 10-2006-0085889

(51) Int. Cl.
   *H03M 1/00*   (2006.01)
(52) U.S. Cl. ............................ 341/141; 341/144
(58) Field of Classification Search .......... 341/130–170
   See application file for complete search history.

(56) References Cited

U.S. PATENT DOCUMENTS

| | | | |
|---|---|---|---|
| 4,016,557 A * | 4/1977 | Zitelli et al. ............ | 341/139 |
| 4,677,422 A * | 6/1987 | Naito ..................... | 341/122 |
| 4,804,957 A | 2/1989 | Selph et al. | |
| 5,208,545 A * | 5/1993 | Schweitzer, III ........ | 341/123 |
| 5,768,152 A | 6/1998 | Battaline et al. | |
| 5,774,733 A | 6/1998 | Nolan et al. | |
| 6,836,230 B2 * | 12/2004 | Le Pailleur et al. ..... | 341/141 |
| 7,209,066 B1 * | 4/2007 | Trumbo ................. | 341/155 |
| 7,245,248 B2 * | 7/2007 | Morita et al. ........... | 341/155 |

(Continued)

FOREIGN PATENT DOCUMENTS

EP    0 706 112 A2    4/1996

(Continued)

OTHER PUBLICATIONS

2005 Conference on Information and Control Systems, Oct. 28, 2005, 5 pages.

(Continued)

*Primary Examiner*—Lam T Mai
(74) *Attorney, Agent, or Firm*—Blakely, Sokoloff, Taylor & Zafman

(57) ABSTRACT

Provided are an apparatus and method for processing analog monitoring signals by using a serial bus. The apparatus includes a multiplexer receiving at least one analog signal and outputting only one of the at least one analog signal in response to a predetermined control signal; an analog-to-digital converter converting the output analog signal into a digital signal; a first controller generating the control signal, outputting the control signal to the multiplexer, and controlling the operation of the analog-to-digital converter; and a bus controller outputting the digital signal via an external serial bus. Accordingly, analog monitoring signals are received, converted into digital data, and output via serial bus even when a large number of analog monitoring signals are present, only if the address input to the apparatus is identical to unique address of the apparatus.

12 Claims, 7 Drawing Sheets

U.S. PATENT DOCUMENTS 7,277,040 B2 * 10/2007 Mazhar ...................... 341/155

FOREIGN PATENT DOCUMENTS

| JP | 2000-092083 | 3/2000 |
| JP | 2006-123607 | 5/2006 |
| KR | 100192636 B1 | 1/1999 |
| KR | 1020010016869 A | 3/2001 |

OTHER PUBLICATIONS

"Design and Development of an Alarm Gathering Interface Equipment for ATM Switching System" by Choong-Reol Yang et al.; *ATM*, pp. 1845-1857, Abstract.

"Design and Development of an Alarm Gathering Interface Equipment for ATM Switching System" by Choong-Reol Yang et al.; *ATM*, pp. 1845-1857, 2000.

* cited by examiner

APPARATUS AND METHOD FOR PROCESSING ANALOG SIGNALS AND OUTPUTTING DIGITALLY CONVERTED ANALOG SIGNALS USING SERIAL BUS

CROSS-REFERENCE TO RELATED PATENT APPLICATIONS

This application claims the priority of Korean Patent Application No. 10-2005-0119068, filed on Dec. 7, 2005, and Korean Patent Application No. 10-2006-0085889, filed on Sep. 6, 2006 in the Korean Intellectual Property Office, the disclosures of which are incorporated herein in their entirety by reference.

BACKGROUND OF THE INVENTION

1. Field of the Invention

The present invention relates to a method and apparatus for processing analog signals in a communication system, and more particularly, to an apparatus and method for processing analog signals in a communication system by selecting one of a plurality of analog signals according to addresses given to the apparatus for processing analog signals or by multiplexing the analog signals, converting the selected signal into a digital signal, and transmitting the digital signal via a serial bus, when there are a large number of analog signals whose states have to be checked.

2. Description of the Related Art

Referring to FIG. 1, a conventional apparatus that processes analog signals converts each monitoring analog signal 101 into digital data via an analog-to-digital (A/D) converter 103 and transmits the digital data upward via a parallel bus 105. As illustrated in FIG. 2, when there are a plurality of monitoring analog signals 201, a plurality of A/D converters 202 corresponding to the analog signals 201 to be collected are needed. Also, since a parallel bus 203 is subject to limited electrical driving strength, there is a restriction whereby only one parallel bus 203 is shared. Furthermore, since an address decoder 204 is present for controlling each A/D converter 202, each of digitally converted analog signals is transmitted to a next stage via a separate parallel bus 205. Accordingly, it is conventionally required to secure signal integrity for parallel data transmission lines, and add components related to parallel bus buffering when designing a circuit or a printed circuit board (PCB), thereby increasing the total number of components and the system size. Also, separate software must be developed in order to collect each analog signal.

SUMMARY OF THE INVENTION

The present invention provides an apparatus and method capable of receiving analog monitoring signals, converting them into digital data, and outputting them via a serial bus even when a large number of analog monitoring signals are present, if the address input to the apparatus is identical to the unique address of the apparatus.

According to an aspect of the present invention, there is provided an apparatus processing analog signals and outputting digitally converted analog signals via a serial bus, the apparatus comprising a multiplexer receiving at least one analog signal and outputting only one of the at least one analog signal in response to a predetermined control signal; an analog-to-digital converter converting the output analog signal into a digital signal; a first controller generating the control signal, outputting the control signal to the multiplexer, and controlling the operation of the analog-to-digital converter; and a bus controller outputting the digital signal via an external serial bus.

According to another aspect of the present invention, there is provided an apparatus for processing analog signals and outputting digitally converted analog signals via a serial bus, the apparatus comprising a multiplexing collecting unit receiving at least one analog signal and activation information, and selecting one of the at least one analog signal, converting the selected signal into a digital signal, and outputting the digital signal via an external serial bus, when the received activation information is identical to the unique address of the multiplexing collecting unit; an address-based collecting unit receiving the activation information, and converting a collected analog signal into a digital signal and outputting the digital signal via the external serial bus when the received activation information is identical to the unique address of the address-based collecting unit; and a serial bus unit providing the external serial bus which connects the multiplexing collecting unit and the address-based collecting unit.

According to another aspect of the present invention, there is provided a data processing method which is performed by an apparatus which processes analog signals and outputting converted analog signals using an external serial bus, the method comprising: receiving at least one analog signal; selecting one of the received at least one analog signal in response to a control signal received via the serial bus, and outputting the selected signal; and converting the selected analog signal into a digital signal and transmitting the digital signal via the serial bus.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings. An apparatus and method according to embodiments of the present invention will be described together for convenience of explanation and in order to help understand the present invention.

Figure 1:
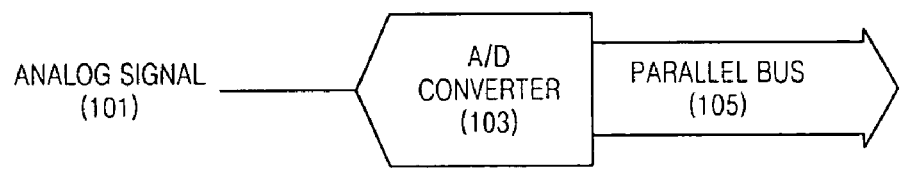
FIG. 1 is a conceptual diagram of a conventional analog-to-digital (A/D) converter for processing analog signals.
Figure 2:
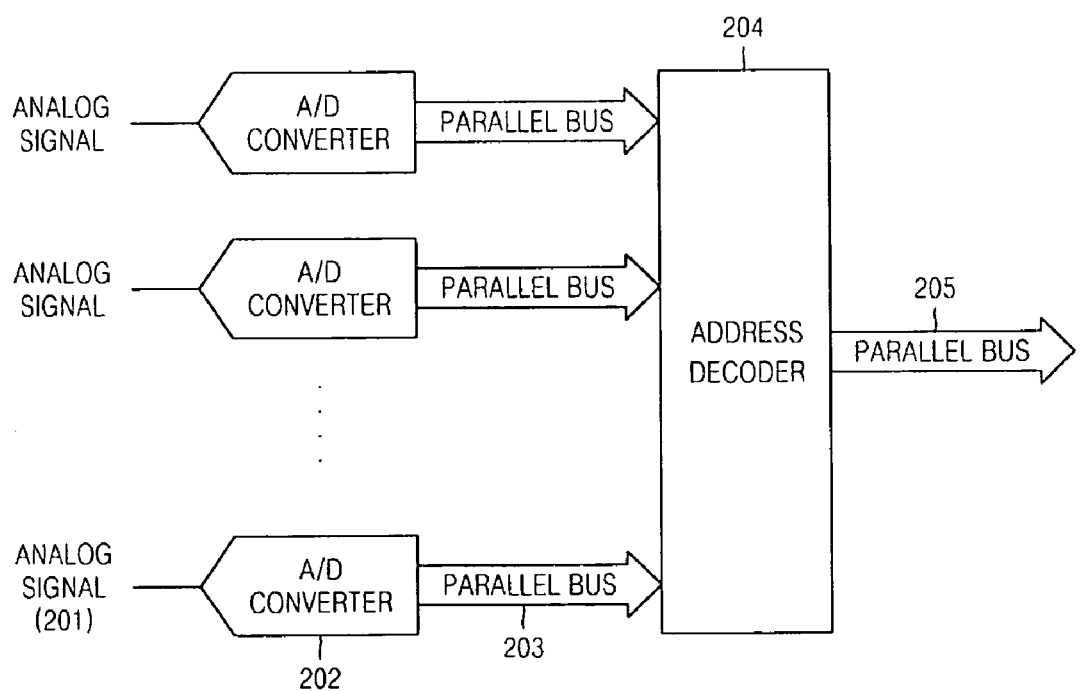
FIG. 2 illustrates an example of an extension of the conventional A/D converter of FIG. 1.
Figure 3A:
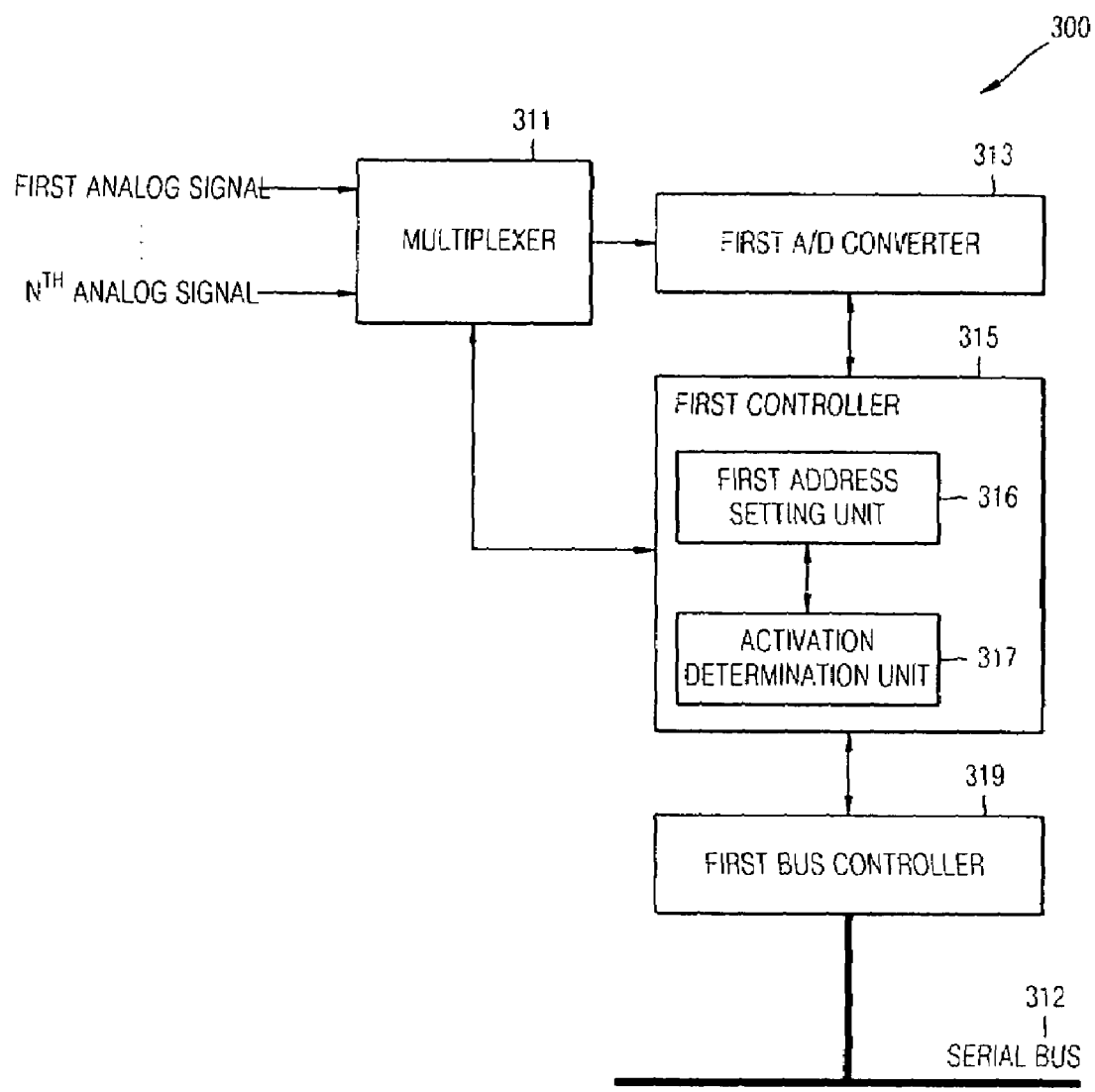
FIG. 3A is a block diagram of an apparatus that processes analog signals by using a serial bus according to an embodiment of the present invention.
Figure 3B:
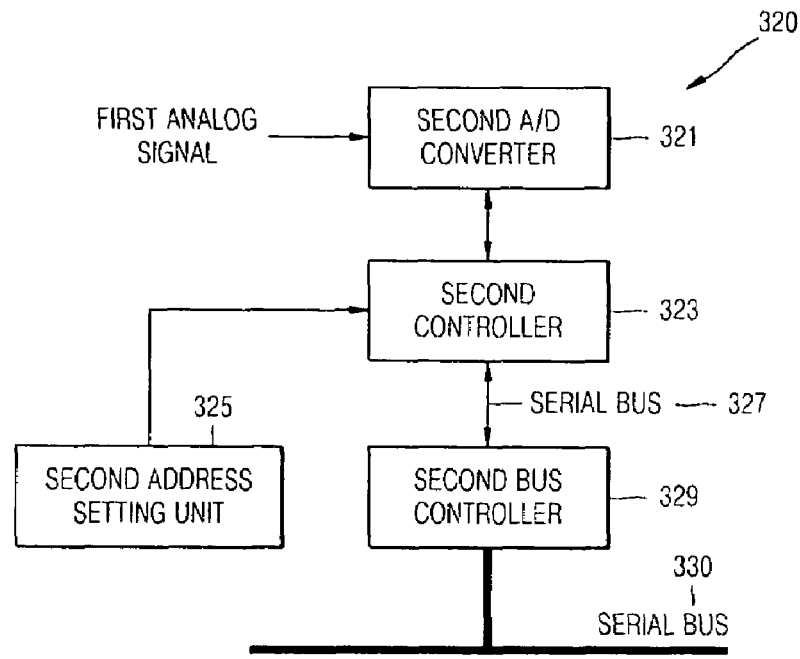
FIG. 3B is a block diagram of an apparatus that processes analog signals by using a serial bus according to another embodiment of the present invention.
Figure 4:
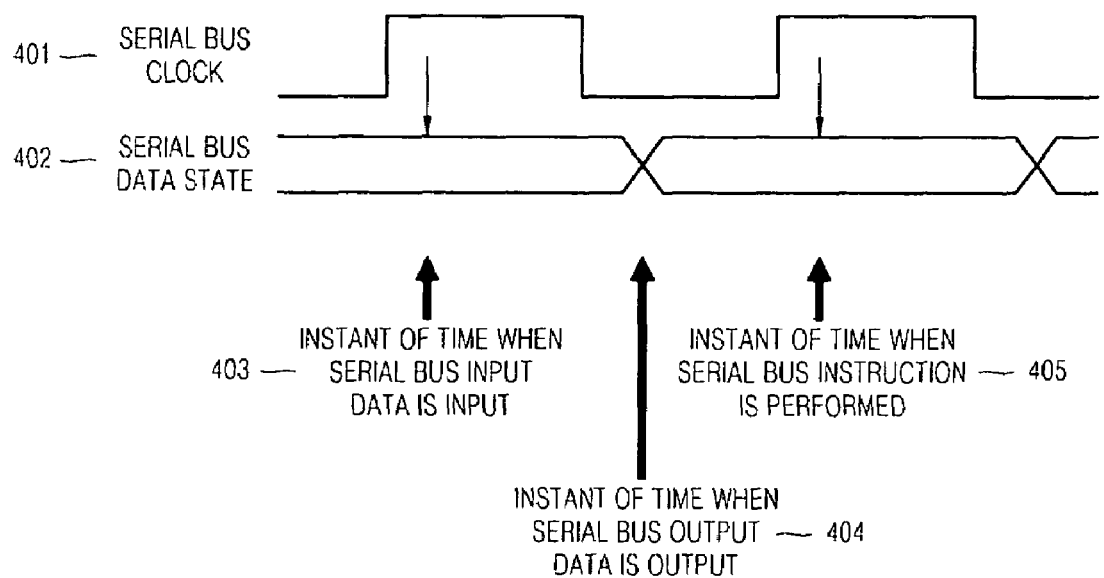
FIG. 4 is a timing diagram of signals output from a serial bus according to an embodiment of the present invention.
Figure 6:
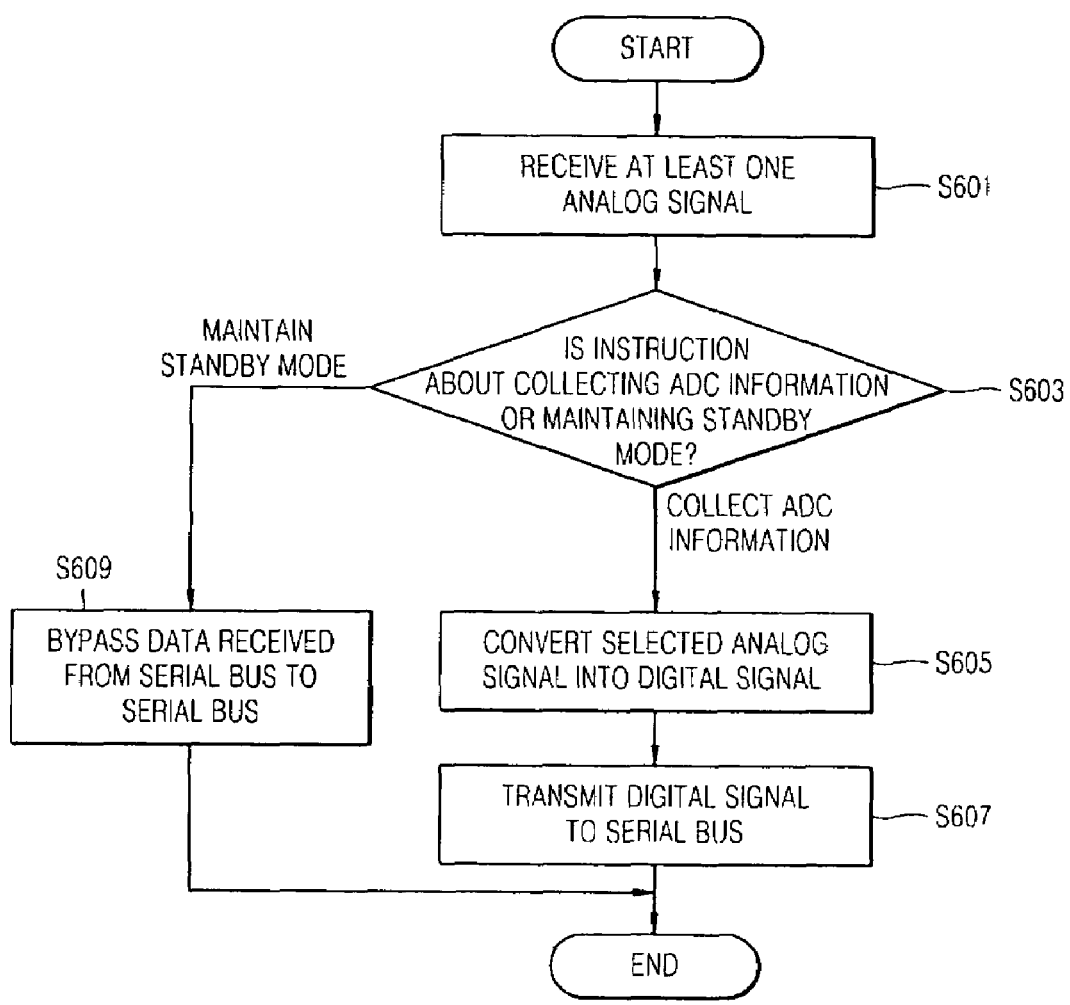
FIG. 6 is a flowchart of a method of processing analog signals by using a serial bus according to an embodiment of the present invention.
Figure 7:
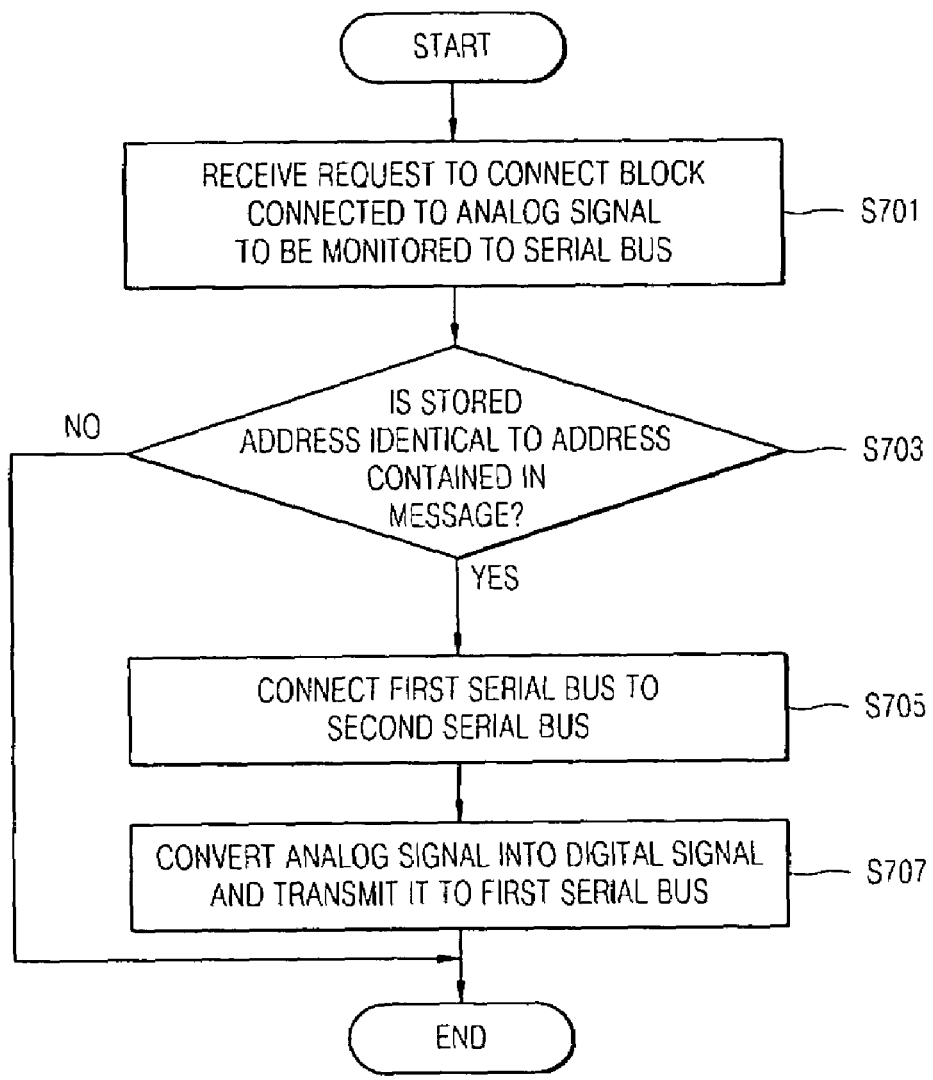
FIG. 7 is a flowchart of a method of processing analog signals by using a serial bus according to another embodiment of the present invention.

FIGS. 3A and 3B are block diagrams of an apparatus that processes analog signals by using a serial bus according to embodiments of the present invention. FIG. 4 is a timing diagram of signals output from a serial bus according to an embodiment of the present invention. FIGS. 5A through 5D illustrate a connection of a plurality of the apparatuses illustrated in FIG. 3A and/or a plurality of the apparatuses illustrated in FIG. 3B. FIGS. 6 and 7 are flowcharts illustrating methods of processing analog signals by using a serial bus according to embodiments of the present invention.

An embodiment of the present invention will now be described with reference to FIGS. 3A and 6. For convenience of explanation, an apparatus 300 that processes analog monitoring signals by using a serial bus, illustrated in FIG. 3A, according to an embodiment of the present invention will be referred to as a "multiplexing collecting unit 300". In operation S601, a multiplexer 311 receives at least one analog monitoring signal. In operation S603, a first controller 315 determines whether an instruction received from an external device (not shown) via a first bus controller 319 instructs to collect analog-to-digital conversion information or maintain a standby mode. The first controller 315 may include a first address setting unit 316 and an activation determination unit 317. In operation S605, the first address setting unit 316 stores a unique address of the multiplexing collecting unit 300. The activation determination unit 317 compares received activation information, i.e., information for determining whether to operate the multiplexing collecting unit 300, with the address stored in the first address setting unit 316. If the result of comparison shows that the activation information is identical to the stored unique address, the multiplexing collecting unit 300 is activated so as to output digitally converted data to a serial bus 312. If it is determined in operation S603 that the instruction instructs to collect the analog-to-digital conversion information the first controller 315 instructs the multiplexer 311 to select one of the at least one analog monitoring signal. The multiplexer 311 inputs the selected analog monitoring signal to the first A/D converter 313. The first A/D converter 313 converts the received analog monitoring signal into a digital signal and outputs the digital signal. In operation S607, the first controller 315 transmits the digital signal to the first bus controller 319, and the first bus controller 319 inputs the digital signal to the serial bus 312 connected to the first bus controller 319.

In operation S609, when the first controller 315 determines that the standby mode is to be maintained, data received from the serial bus 312 is directly output via the serial bus 312, and then, the method of FIG. 6 is terminated.

Next, another embodiment of the present invention will be described with reference to FIGS. 3B and 7. For convenience of explanation, an apparatus 320 that processes analog monitoring signals by using a serial bus, illustrated in FIG. 3B, according to another embodiment of the present invention will be referred to as an "address-based collecting unit 320".

The address-based collecting unit 320 does not include a multiplexer; instead, it includes an address setting unit 325, unlike the multiplexing collecting unit 300. The address setting unit 325 stores a current address of the address-based collecting unit 320. The address of the address-based collecting unit 320 may be variously changed by a user. In operation S701, a second bus controller 329 receives a request from an external device (not shown), which drives a first serial bus 330, to connect a block, which receives analog signals to be monitored, to the first serial bus 330. Then, the second bus controller 329 transmits the request to the second controller 323. In operation S703, the second controller 323 reads the stored address from the address setting unit 325, and determines whether the stored unique address is identical to an address contained in the request. In operation S705, if it is determined that the stored unique address is the same as the contained address, the result of the determination is transmitted to the second bus controller 329, and the second bus controller 329 connects the first serial bus 330 to the second serial bus 327. In operation S707, the second controller 323 instructs the second A/D converter 321 to convert the analog signal into a digital signal. The digital signal output from the second A/D converter 321 in response to the instruction is transmitted to the external device via the first serial bus 330.

However, if it is determined that the stored address is not the same as the contained address, the request for connection is disregarded so as to prevent the external device from being connected to the first serial bus 330.

The serial bus 330 will now be described with reference to FIG. 4. The serial bus 312 of FIG. 3A, and the first serial bus 330 and the second serial bus 327 of FIG. 3B include four indispensable signals: a serial bus clock 401, a serial bus input data 402, an instruction input data, and a serial bus output data in response to the instruction input data. The serial bus clock 401 is used as a reference clock signal for operating a serial bus. The serial bus input data 402 is received at an instant of time 403 when the clock 401 transits from logic "low" (0) to logic "high" (1), and the serial bus output data is output at an instant of time 404 when the clock 401 transits from logic "high" (1) to logic "low" (0). Furthermore, an instruction or data included in the serial bus input data 402 is processed at an instant of time 405 when a serial bus instruction is performed, after a cycle of the clock signal from the instant of time 403.

Figure 5A:
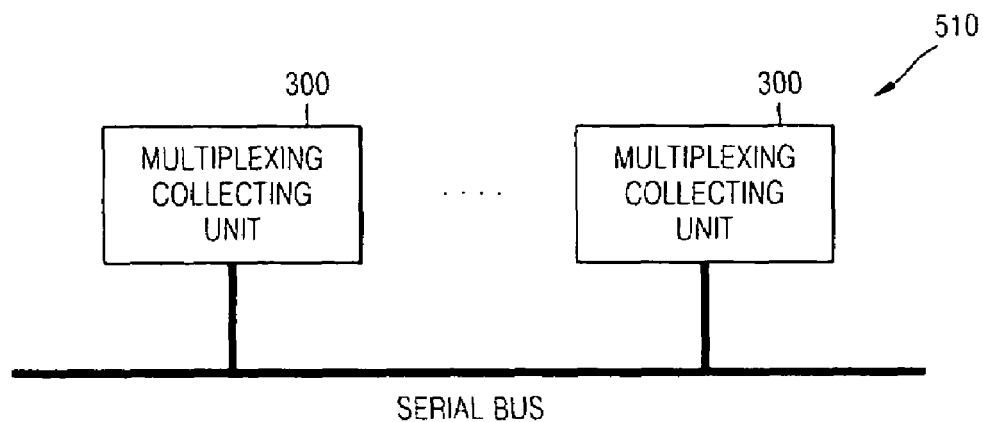
FIGS. 5A through 5D illustrate a connection of a plurality of the apparatuses illustrated in FIG. 3A and/or a plurality of the apparatuses illustrated in FIG. 3B.

FIGS. 5A through 5D illustrate an extended connection of a plurality of multiplexing collecting units 300 and/or a plurality of address-based collecting units 320 on a first serial bus. FIG. 5A illustrates connection of a plurality of multiplexing collecting units 300 via a serial bus. In this case, the first address setting unit 316 and the activation determination unit 317 of FIG. 3A in each multiplexing collecting unit 300 operate in order to activate the multiplexing collecting unit 300 so as to be connected via the serial bus only when the address of the multiplexing collecting unit 300 is identical to an externally input address.

Figure 5B:
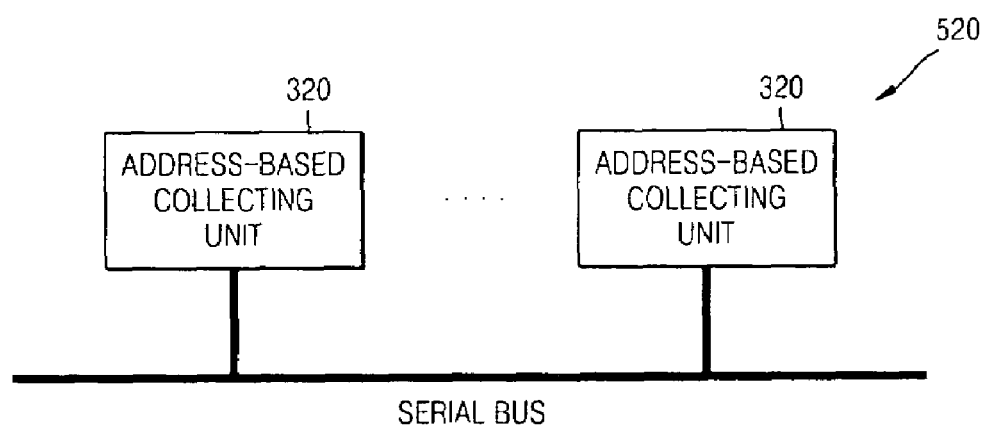

FIG. 5B illustrates a connection of a plurality of address-based collecting units 320 via a serial bus. In this case, the second address setting unit 325 and the second controller 323 illustrated in FIG. 3B in each address-based collecting unit 320 operate in order to activate the address-based collecting unit 320 so as to be connected via the serial bus only when the address of the address-based collecting unit 320 is identical to an externally input address.

Figure 5C:
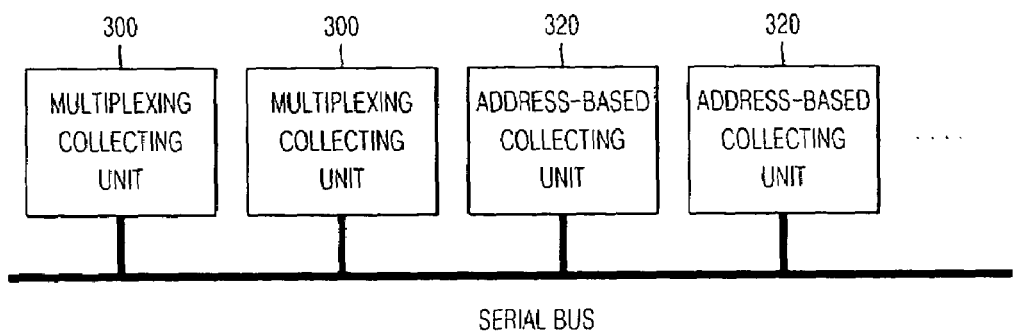

FIG. 5C illustrates a connection of a plurality of multiplexing collecting units 300 and a plurality of address-based collecting units 320. Similarly, in this case, the multiplexing collecting units 300 and the address-based collecting units 320 are also activated so as to be connected via a serial bus without a collision, only when their addresses are identical to an externally input address.

Figure 5D:
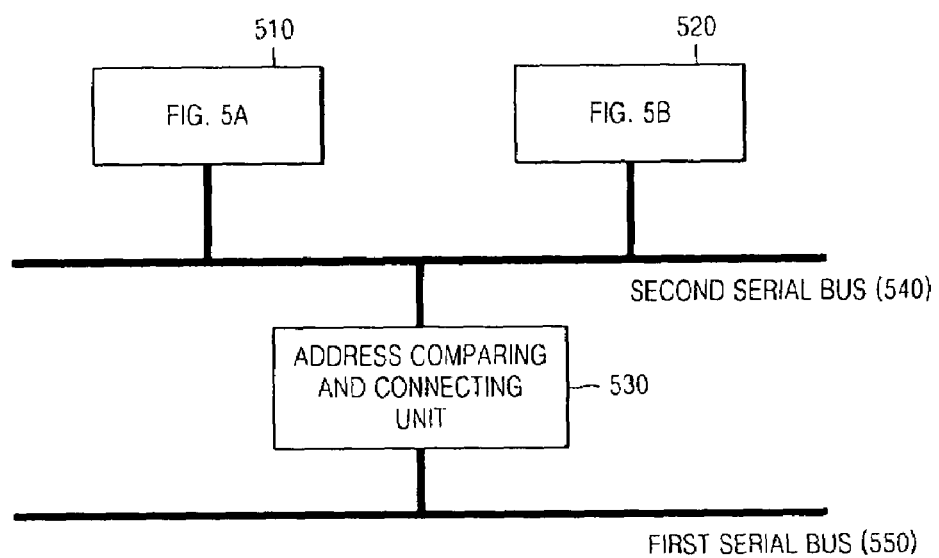

FIG. 5D illustrates a connection of a block 510, illustrated in FIG. 5A, which consists of only a plurality of multiplexing collecting units 300, and a block 520, illustrated in FIG. 5B, which consists of only a plurality of address-based collecting units 520, via a second serial bus 540, and an address comparing and connecting unit 530 that stores the address of a whole block. The address comparing and connecting unit 530 forms a communication path together with a first serial bus 550 that connects the whole block to another whole block only when the stored address is identical to a an address in input information from external device (not shown).

In regard to the connection via a serial bus, a serial bus clock signal and an instruction signal are shared, and serially output data signals from a multiplexing collecting unit 300 depend on serially input signals from a subsequent multiplexing collecting unit 300. Thus, even when there are a large number of analog signals to be monitored, the connection can be easily extended via the first serial bus 550. Also, an address-based collecting unit 320 connected to a multiplexing collecting unit 300, and another address-based collecting unit 320 connected in series to the former address-based collecting unit 320, are also preferably extended and connected, so that a serial bus data input signal and a serial bus data output signal that are exchanged between adjacent blocks are dependently connected and a serial bus clock signal and an instruction signal are shared.

A method of processing analog monitoring signals by using a serial bus according to the present invention can be embodied as computer readable code in a computer readable medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as computer readable code in the distributed system.

As described above, in an apparatus and method for processing analog monitoring signals by using a serial bus according to the present invention, one of a plurality of analog monitoring signals for checking the internal state of the system is selected by allocating addresses to apparatus for processing the analog signals or by using a multiplexer, the selected signal is converted into digital data, and the digital data is transmitted via a serial bus. Accordingly, it is possible to solve the problems of the prior art, that is, it is complicated to design a circuit that uses a plurality of parallel buses, an additional buffer is needed to increase bus driving strength, an address decoder is needed, A/D converters corresponding to a plurality of monitoring analog signals are needed, a large number of components are needed to design a circuit, thus increasing the system size, and separate software must be developed so as to control individual A/D conversion.

Also, it is possible to selectively apply a multiplexing collecting unit to a region in which analog monitoring signals are densely distributed and an address-based collecting unit to a region in which analog monitoring signals are scarcely distributed, or use both the multiplexing collecting unit and the address-based collecting unit. Furthermore, it is possible to consistently construct a simple serial bus circuit by dependently connecting the multiplexing collecting units and the address-based collecting units while a plurality of multiplexing collecting units and a plurality of address-based collecting units are located on the same serial bus, thereby securing scalability.

Also, since various methods of controlling collecting units using a serial bus are unified, it is possible to remove a need for development of separate software for individual monitoring analog signals.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus processing analog signals and outputting digitally converted analog signals via a serial bus, the apparatus comprising:
    a multiplexer receiving at least one analog signal and outputting only one of the at least one analog signal in response to a control signal;
    an analog-to-digital converter converting the output analog signal into a digital signal;
    a first controller generating the control signal, outputting the control signal to the multiplexer, and controlling the operation of the analog-to-digital converter; and
    a bus controller outputting the digital signal via an external serial bus,
    wherein the first controller comprises:
    a first address setting unit storing a unique address of the apparatus; and
    an activation determination unit receiving activation information via the external serial bus, determining whether the activation information is identical to the unique address of the apparatus, activating the bus controller when the activation information is identical to the unique address, and deactivating the bus controller otherwise.

2. The apparatus of claim 1, which is connected via the external serial bus to at least one other apparatus.

3. An apparatus processing analog signals and outputting digitally converted analog signals via a serial bus, the apparatus comprising:
    an analog-to-digital converter converting an analog signal into a digital signal and outputting the digital signal; an address setting unit storing a unique address of the apparatus;
    a first controller determining whether externally input activation information is identical to the unique address; and
    a serial bus controller connecting the digital signal to an external serial bus when it is determined that the externally input activation information is identical to the unique address.

4. The apparatus of claim 3, wherein the unique address is set differently from at least one other apparatus so that the at least one other apparatus is connectable to the apparatus via the external serial bus.

5. An apparatus processing analog signals and outputting digitally converted analog signals via a serial bus, the apparatus comprising:
    a multiplexing collecting unit receiving at least one analog signal and activation information, and selecting one of the at least one analog signal, converting the selected signal into a digital signal, and outputting the digital signal via an external serial bus, when the received activation information is identical to unique address of the multiplexing collecting unit;
    an address-based collecting unit receiving the activation information, and converting a collected analog signal into a digital signal and outputting the digital signal via the external serial bus when the received activation information is identical to a unique address of the address-based collecting unit; and
    a serial bus unit providing the external serial bus which connects the multiplexing collecting unit and the address-based collecting unit.

6. The apparatus of claim 5, wherein the multiplexing collecting unit comprises:

a multiplexer receiving at least one analog signal and outputting one of the at least one analog signal in response to a predetermined control signal; an analog-to-digital converter converting the output analog signal into a digital signal;

a first controller generating the control signal, outputting the control signal to the multiplexer, and controlling the operation of the analog-to-digital converter; and a bus controller outputting the digital signal via the external serial bus.

7. The apparatus of claim 6, wherein the first controller comprises:

a first address setting unit storing a unique address of the multiplexing collecting unit; and an activation determination unit receiving activation information via the serial bus, determining whether the activation information is identical to the unique address, activating the bus controller when the activation information is identical with the unique address, and deactivating the bus controller otherwise.

8. The apparatus of claim 5, wherein the address-based collecting unit comprises:

a second analog-to-digital converter converting an analog signal into a digital signal and outputting the digital signal;

a second address setting unit storing a unique address of the address-based collecting unit;

a second controller determining whether the activation information is identical to the unique address of the address-based collecting unit; and a serial bus controller connecting the digital signal to the external serial bus when the activation information is identical to the unique address of the address-based collecting unit.

9. The apparatus of claim 5, wherein the multiplexing collecting unit and the address-based collecting unit have their own unique address, and the multiplexing collecting unit and the address-based collecting unit are activated so as to be connected to at least another apparatus via the external serial bus, only when the activation information is identical to the unique address.

10. The apparatus of claim 5, further comprises an address comparing and connecting unit storing a unique address of the apparatus, and activating the apparatus so as to be connected to the external serial via when information input to the apparatus is identical with the unique address of the apparatus.

11. A data processing method which is performed by an apparatus which processes analog signals and outputting converted analog signals using an external serial bus, the method comprising:

(a) receiving at least one analog signal;

(b) selecting one of the received at least one analog signal in response to a control signal received via the serial bus, and outputting the selected signal; and (c) converting the selected analog signal into a digital signal and transmitting the digital signal via the serial bus, wherein (c) comprises:

(c1) setting a unique address of the apparatus;

(c2) comparing an address contained in the control signal and the unique address of the apparatus in order to determine whether they are identical to each other; and (c3) allowing the digital signal to be transmitted to the serial bus when the contained address is identical to the unique address, and preventing the digital signal from being transmitted via the serial bus otherwise.

12. A computer readable medium having recorded thereon a computer program for execution by a computer of a data processing method which is performed by an apparatus which receives analog signals and outputs digitally converted signals via an external serial bus, the method comprising:

(a) receiving at least one analog signal;

(b) selecting one of the received at least one analog signal in response to a control signal received via the serial bus, and outputting the selected signal; and (c) converting the selected analog signal into a digital signal and transmitting the digital signal to the serial bus, wherein said converting comprises:

(c1) setting a unique address of the apparatus;

(c2) comparing an address contained in the control signal and the unique address of the apparatus in order to determine whether they are identical to each other; and (c3) allowing the digital signal to be transmitted to the serial bus when the contained address is identical to the unique address, and preventing the digital signal from being transmitted via the serial bus otherwise.

* * * * *